United States Patent [19]

Brunelle

[11] E Re. 31,262

[45] Reissued May 31, 1983

[54] POLYCARBONATE TRANSESTERIFICATION

[75] Inventor: Daniel J. Brunelle, Schenectady, N.Y.

[73] Assignee: General Electric Company, Schenectady, N.Y.

[21] Appl. No.: 353,686

[22] Filed: Mar. 1, 1982

Related U.S. Patent Documents

Reissue of:

[64] Patent No.: 4,310,656
Issued: Jan. 12, 1982
Appl. No.: 134,705
Filed: Mar. 27, 1980

[51] Int. Cl.[3] ..... C08G 63/62

[52] U.S. Cl. ..... 528/200; 528/202

[58] Field of Search ..... 528/200, 202

[56] References Cited

U.S. PATENT DOCUMENTS 4,170,587 10/1979 Schmidt et al. ..... 528/202

*Primary Examiner*—Maurice J. Welsh

*Attorney, Agent, or Firm*—Robert J. Traverso; James C. Davis, Jr.

[57] ABSTRACT

An improved polycarbonate transesterification process comprising reacting mixtures of bis(ortho-haloaryl)carbonate/-ortho-haloaryl aryl carbonate and a dihydric phenol under transesterification reaction conditions.

10 Claims, No Drawings

POLYCARBONATE TRANSESTERIFICATION

Matter enclosed in heavy brackets [ ] appears in the original patent but forms no part of this reissue specification; matter printed in italics indicates the additions made by reissue.

CROSS REFERENCE TO RELATED APPLICATIONS

This invention is related to U.S. patent applications Ser. No. 262,287 filed May 11, 1981, Ser. No. 258,127 filed Apr. 27, 1981, Ser. No. 106,855 and Ser. No. 106,856 both filed Dec. 26, 1979, Ser. No. 143,804 filed Apr. 23, 1980, Ser. No. 134,349, filed Mar. 27, 1980, all of Daniel Joseph Brunelle; and U.S. Ser. Pat. No. 4,217,438 of Daniel Joseph Brunelle and William Edward Smith. The above applications are assigned to the assignee of this invention and all of their disclosures are incorporated herein in their entirety by reference.

BACKGROUND OF THE INVENTION

1. Field of the Invention

This invention relates to an improved polycarbonate transesterification process comprising reacting mixtures of bis(ortho-haloaryl) carbonate/ortho-haloaryl aryl carbonate and a dihydric phenol under transesterification reaction conditions.

2. Description of the Prior Art

In general, polycarbonate transesterification prior art including The Enchclopedia of Polymer Science, Vol. 10 (1969), Chemistry and Physics of Polycarbonates, Polymer Reviews, H. Schnell, Vol. 9, John Wiley and Sons, Inc. (1964); "Polycarbonates", Christopher and Fox, Re'nhold Corporation of New York (1962); among other publications, including numerous U.S. and foreign patents including Great Britain Pat. No. 1,079,822 issued to Bayer (1966), authored by Curtius, Ludwig, Bottenbruch and Schnell, report that generally effective transesterification reactions involving aromatic dihydroxy compounds with carbonic acid aromatic diesters can be carried out in the presence of basic catalysts in the formation of high molecular weight impact-resistant thermoplastic polycarbonates.

DESCRIPTION OF THE INVENTION

This invention embodies an improved polycarbonate transesterification process comprising reacting mixtures of bis(ortho-haloaryl)carbonate/ortho-haloaryl aryl carbonate and a dihydric phenol under transesterification reaction conditions.

The "bis(ortho-haloaryl)carbonate" also commonly referred to as a carbonic acid aromatic diester of an orthohalophenol is defined herein by the general formula:

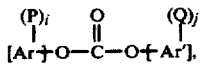

I.

where at least a P or Q substituent is an ortho-positioned halogen, e.g. Cl, F, Br or I, or a trifluoromethyl group, e.g. $-CF_3$, directly bonded to a ring carbon atom located adjacent to an oxy group of the carbonate, i and j represent whole numbers of at least 1 up to a maximum equivalent to the number of replaceable hydrogen atoms or alkyl groups, e.g. $C_{1-4}$ alkyl, substituted for on the aromatic rings comprising Ar and Ar'.

Presently preferred bis(ortho-haloaryl)carbonates are of the formula:

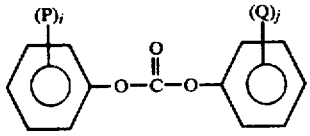

where independently at least a P or Q is an ortho-positioned halogen or a trifluoromethyl group, i and j are as defined above. Specific examples follow:

bis(o-chlorophenyl)carbonate
bis(o-trifluoromethylphenyl)carbonate
bis(o-chloro-p-methylphenyl)carbonate
o-iodophenyl o-trifluoromethylphenyl carbonate
bis(o-fluorophenyl)carbonate The "ortho-haloaryl aryl carbonate" can also be referred to as a carbonic acid aromatic diester of an orthohalophenol and a phenol, and is defined herein by the general formula:

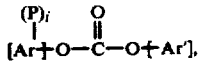

II.

where P is as defined above, i represents a whole number of at least 1 up to a maximum equivalent to the number of replaceable hydrogen atoms or alkyl groups, e.g. $C_{1-4}$ alkyl, substituted for on the aromatic ring comprising Ar, Ar' being an aromatic ring.

Presently preferred ortho-haloaryl aryl carbonates are of the formula:

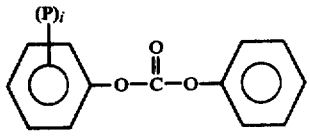

where independently P is an ortho-positioned halogen or a trifluoromethyl group, and i and j is as defined above. Specific examples follow:

o-chlorophenyl phenyl carbonate
o-trifluoromethylphenyl phenyl carbonate
o-chloro-p-methylphenyl phenyl carbonate
o-trifluoromethylphenyl phenyl carbonate
o-fluorophenyl phenyl carbonate Sterically hindered "bis(ortho-haloaryl)carbonates" or "ortho-haloaryl aryl carbonates" having P and Q substituents positioned on all available ortho positions of the same aromatic ring are excluded as reactants in this patent.

Any of the dihydric phenols, bases, reaction parameters relative to amounts of reactants, etc., as well as reaction time, temperature and pressure described in U.S. Pat. No. 4,217,438 of D. J. Brunelle and W. E. Smith can be employed in the process of this patent. Accordingly, for brevity their descriptions are incorporated herein in their entirety by reference.

Illustratively, "dihydric phenols" include dihydric or dihydroxy aromatic compounds—also incorporated herein by reference—defined by Fox's Formula II in U.S. Pat. No. 3,153,008, column 2, lines 23–72 and column 3, lines 1–42. Presently preferred dihydric phenols are of the formulas:

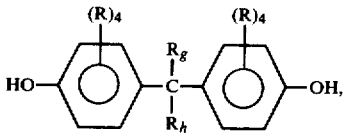

where independently each R is hydrogen, $C_{1-4}$ alkyl, methoxy, bromine and chlorine, $R_g$ and $R_h$ are hydrogen or a $C_{1-30}$ monovalent hydrocarbon or hydrocarbonoxy group, and

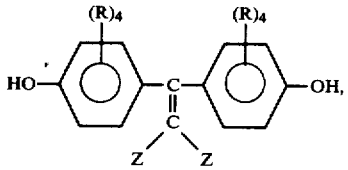

where independently each R is as defined above and each Z is hydrogen, chlorine or bromine, subject to the proviso that at least one Z is chlorine or bromine.

Specific examples follow:

4,4'-dihydroxy-diphenyl-1,1-butane,
4,4'-dihydroxy-diphenyl-2-chlorophenyl methane,
4,4'-dihydroxy-diphenyl-2,2-propane also known as "BPA" or bis(4-hydroxyphenyl)propane-2,2,
4,4'-dihydroxy-3-methoxy-diphenyl-2,2-propane,
4,4'-dihydroxy-3-isopropyl-diphenyl-2,2-propane,
4,4'-dihydroxy-diphenyl-2,2-nonane,
4,4'-dihydroxy-2,2',3,3',5,5',6,6'-octamethyl-diphenyl methane,
4,4'-dihydroxy-2,2'-dimethyl-5,5'-di-tert.-butyldiphenyl methane,
4,4'-dihydroxy-3,3',5,5'-tetrachloro-diphenyl-2,2-propane,
4,4'-dihydroxy-3,3',5,5'-tetrabromo-diphenyl-2,2-propane,
1,1-dichloro-2,2-bis(4-hydroxyphenyl)ethylene,
1,1-dibromo-2,2-bis(4-hydroxyphenyl)ethylene,
1,1-dichloro-2,2-bis(5-methyl-4-hydroxyphenyl)ethylene,
1,1-dibromo-2,2-bis(3,6-n-butyl-4-hydroxyphenyl)ethylene,
1,1-dichloro-2,2-bis(2-chloro-5-ethyl-4-hydroxyphenyl)-ethylene,
1-bromo-2,2-bis(4-hydroxyphenyl)ethylene,
1,1-dichloro-2,2-bis(2-ethoxy-4-hydroxyphenyl)ethylene, and
1-bromo-2,2-bis(3,5-diphenylether-4-hydroxyphenyl-)ethylene.

Illustrative specific examples of inorganic or organic bases that can be employed follow: sodium metal, lithium hydroxide, quaternary phosphonium sodium carbonate, sodium acetate, sodium methylate, sodium tetrasulfide, sodium borohydride, isopropylamine, propanediamine, pyridine, 1,2,2,6,6-pentamethylpiperidine, sodium benzoate, sodium methylate, sodium phenoxide, sodium salts of bisphenol-A, etc.

Presently preferred bases are certain "metal hydride" catalysts—described in greater detail in U.S. Ser. No. 106,856 previously referred to—and include any compound which contains aluminumhydride or boronhydride counter-ions, for example alkali metal, alkaline earth metal, quaternary ammonium, quaternary phosphonium, or tertiary sulfonium aluminumhydrides or boronhyrides.

An especially preferred metal hydride is the product obtained by forming a homogeneous solution or melt of a metal hydride containing aluminumhydride or boronhydride counterions with a bis(ortho-haloaryl)carbonate, an ortho-haloaryl aryl carbonate, or dihydric phenol, subsequently separating any solvent—if used, cooling, and recovering a homogeneous solid pre-formed mixture of metal hydride and a bis(ortho-haloaryl)carbonate, an ortho-haloaryl aryl carbonate or a phenol, including continuations thereof.

Any amount of base can be employed. In general, effective mole ratios of base, e.g. LiOH, $LiAlH_4$, $Me_4NBH_4$, etc., to dihydric phenols are within the range of from about $1\times10^{-8}$ to even lower to about 1 to 1, or even higher, preferably from $1\times10^{-6}$ to 1 to about $1\times10^{-2}$ to 1, and more preferably from $1\times10^{-5}$ to 1 to $1\times10^{-3}$ to 1. Generally, mole ratios of at least $1\times10^{-5}$ to 1 enhances both the reaction rate and the yield of polycarbonate.

Any reaction pressure can be employed, e.g. atmosphere, subatmosphere or superatmospheric. Generally, however, the process is preferably carried out under a reaction pressure of approximately 1 atm. (~760 mm. Hg.) during the initial phase of the reaction with a subsequent pressure reduction to values in the order of 0.1 to 1.0 Hg. (vacuum), or even lower.

Any reaction temperature can be employed. Optimum reaction temperatures are generally within the range of from 80° C. or even lower, to 300° C. or even higher, and more often 120° C. to 260° C.

Any reaction time can be employed. Generally, optimum reaction time periods are from about 0.5 hours or even less to about 24 hours or even more.

GENERAL PROCEDURE

EXAMPLE I 22.83 g. of bis(4-hydroxyphenyl)propane-2,2 (100.0 mmol.), 28.58 g. of bis(o-chlorophenyl)carbonate (101.0 mmole.) and 8.5 mg. of tetramethylammoniumboron tetrahydride ($Me_4NBH_4$) were heated under 40 mm Hg (vacuum) from room temperature (r.t.) to about 170° C. over 1½ hours, and under 10 mm Hg at 170° to 220° C. for an additional 1.0 hour. A control-contrast transesterification reaction was carried out substituting diphenylcarbonate for bis(o-chlorophenyl)carbonate.

A summary of the process time—temperature—pressure sequence and the properties of the resulting polycarbonates is set out in Tables I and II, respectively.

TABLE I

Summary of Transesterification General Procedure-Control-Reaction Parameters

| Carbonate Starting Material | Cumulative Reaction Time/hr. | Time Individual Interval/hr. | Temp. °C. | Pressure Hg |
|---|---|---|---|---|
| CPC[1] | 1.50 | 1.50 | r.t.-170 | vacuum 40 mm |
| " | 2.50 | 1.0 | 170-220 | vacuum 10 mm |
| " | 3.00 | 0.5 | 285 | vacuum 0.1 mm |
| Summary | 3.00 | N.A. | r.t.-[220]*285* | vacuum 40-[10]*0.1 mm* mm |
| DPC[2] | 1.50 | 1.50 | r.t.-170 | vacuum 40 mm |
| " | 2.50 | 1.0 | 170-220 | vacuum 10 mm |
| " | 3.0 | 0.50 | 220 | vacuum 1 mm |
| " | 3.75 | 0.75 | 300° | vacuum 0.1 mm |
| Summary | 3.75 | N.A. | r.t.- | vacuum |

TABLE I-continued

| Summary of Transesterification General Procedure-Control-Reaction Parameters | | | | |
|---|---|---|---|---|
| Carbonate Starting Material | Cumulative Reaction Time/hr. | Time Individual Interval/hr. | Temp. °C. | Pressure Hg |
| | | | [220]*300* | 40-[1]*0.1mm* |

FOOTNOTES:
[1] = bis(o-chlorophenyl)carbonate
[2] = diphenylcarbonate

TABLE II

| Ex. No. | Carbonate Starting Material | BPA-polycarbonate Color[3] | $MW_w$[4] | I.V.[5] | % OH[6] |
|---|---|---|---|---|---|
| I | bis(o-chlorophenyl) carbonate | colorless | [15,500]*44,100* | — | 0.519 |
| Control | diphenylcarbonate | | 14,200 | — | 0.638 |

FOOTNOTES:
[3] = color recorded at the end of the reaction while retained in the reactor
[4] = GPC wt. avg. MW, rel. to polystyrene
[5] = IV measured in $CHCL_3$ 25° C.
[6] = hydroxyl end group infrared absorption at 3585 cm.$^{-1}$ based on a 2.5% solution in $CH_2Cl_2$

EXAMPLES II-V

A series of transesterification reactions were carried out according to the general procedure of Example I with the exception that the monocarbonates employed were mixtures of bis-(ortho-chlorophenyl)carbonate and ortho-chlorophenyl phenylcarbonate. The resulting polycarbonates were dissolved in methylene chloride, precipitated in methanol and analyzed for phenoxy or orthochlorophenoxy end groups by dissolving the polymers in 4 ml. 1f tetrahydrofuran (THF) subsequently contacted with 5 ml. of a 5% methanolic potassium hydroxide solution. After stirring for 24 hours, a resulting cloudy solution was treated with acetic acid until clear and then analyzed by liquid chromatography to determine the relative amount of phenoxy or orthochlorophenoxy end groups associated with the polycarbonates.

A summary of the mixture of bis(ortho-chlorophenyl)carbonate:ortho-chlorophenyl phenylcarbonate expressed in mole percent, and the percent phenoxy or chlorophenoxy end groups associated with the resulting polycarbonates is set out in Table III hereafter. The molecular weight and percent hydroxyl groups associated with polycarbonates is generally analogous to that described by Example I in Table II:

TABLE III

| Ex. No. | Carbonate Starting Material | Mol % CPC:CPPC | End Group % Phenoxy | o-chlorophenoxy |
|---|---|---|---|---|
| II | CPC:CPPC[7] | 99.7:0.3 | 8 | 92 |
| III | " | 99.0:1.0 | 18 | 82 |
| IV | " | 98.5:1.5 | 25 | 75 |
| V | " | 97.0:3.0 | 44 | 56 |

[7] = ortho-chlorophenyl phenylcarbonate

As illustrated by Examples II-V, the presence and amount of ortho-chlorophenyl phenylcarbonate permits controlled end-capping transesterification reactions whereby controlled amounts of phenoxy end groups (phenoxy end-capped polycarbonates) can be prepared in accordance with the process of this patent. Routine experimentation by those of ordinary skill in the art will establish under various transesterification reaction conditions the relative proportions of o-chlorophenyl phenylcarbonate to bis(chlorophenyl)carbonate required to provide substantially approximately—up to an maximum of about 94% phenoxy end-capped polycarbonates.

In general, the use of mixtures of monocarbonate in polycarbonate transesterification processes—in addition to controlled aryl end-capping of the resulting polycarbonate—provides advantages not associated with other carbonate transesterification substrates, such as diphenylcarbonate. The use of mixtures of carbonate substrates provides—when contrasted with diphenylcarbonate—the following advantages: (1) improved transesterification reaction rate, (2) less polycarbonate color formation during the transesterification reaction, (3) milder transesterification reaction conditions including lower temperatures and pressures, (4) reduced amounts of carbonate substrate since only stoichiometric amounts or amounts slightly in excess, e.g. 0.5 to 1%, are required for complete conversion of all dihydric phenol to polycarbonate, and (5) reduced quantities of catalyst at improved reaction rate, and temperature transesterification reaction conditions. Illustratively the transesterified polycarbonate end products derived from the process of this patent, preferably exhibit intrinsic viscosities of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful polycarbonates generally have an intrinsic viscosity within the range of from about 0.38 to about 0.7 dl./g. Preferably, the polycarbonates have a number average molecular weight of at least about 5,000, and more preferably from about 10,000 to about 50,000. Polycarbonates of such molecular weight characteristics process easily inbetween about 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

I claim:

1. A polycarbonate transesterification process comprising reacting mixtures of bis(ortho-haloaryl)carbonate/orthohaloaryl arylcarbonate and a dihydric phenol under transesterification reaction conditions.

2. The claim 1 process where the bis(ortho-haloaryl)carbonate is of the formula:

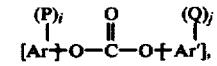

where at least a P or Q substituent is an ortho-positioned halogen or a trifluoromethyl group directly bonded to a ring carbon atom located adjacent to an oxy group of the carbonate, i and j represent whole numbers of at least 1 up to a maximum equivalent to the number of replaceable hydrogen atoms or alkyl groups substituted for on the aromatic rings comprising Ar and Ar', and the ortho-haloaryl arylcarbonate is of the formula:

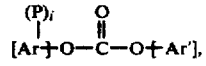

where P, i, and Ar are as defined above, Ar' being an aromatic ring.

3. The claim 1 process where the dihydric phenol is of the formula:

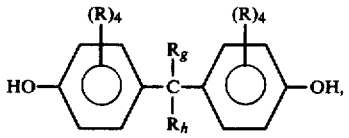

where independently each R is hydrogen, $C_{1-4}$ alkyl, methoxy, bromine or chlorine, $R_g$ and $R_h$ are hydrogen or a $C_{1-30}$ monovalent hydrocarbon or hydrocarbonoxy group or of the formula:

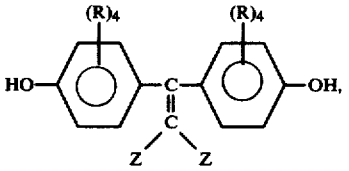

where independently each R is as defined previously and each Z is hydrogen, chlorine or bromine, subject to the proviso that at least one 2 is chlorine or bromine.

4. The claim 2 process where the transesterification reaction conditions employ a metal hydride catalyst selected from the class consisting of alkali metal, alkaline earth metal, quaternary ammonium, quaternary phosphonium, tertiary sulfonium aluminum hydrides and boron hydrides.

5. The claim 4 process where the metal hydride catalyst is a pre-formed mixture of a metal hydride and a bis(ortho-haloaryl)carbonate, an ortho-haloaryl aryl carbonate or a dihydric phenol.

6. The claim 1 process where the transesterification reaction conditions are at temperatures less than about 300° C.

7. The claim 6 process where the transesterification reaction conditions include an inert atmosphere.

8. The claim 2 process where the carbonate mixture is bis(o-chlorophenyl) carbonate and o-chlorophenyl phenyl carbonate.

9. The claim 3 process where the dihydric phenol is bis(4-hydroxyphenyl)propane-2,2.

10. A polycarbonate transesterification process comprising reacting a mixture of bis(ortho-chlorophenyl)-carbonate and o-chlorophenyl phenyl carbonate with bis-(4-hydroxyphenyl)propane-2,2 under transesterification conditions.

* * * * *